INVENTOR.
CARL G. A. JOHNSON
BY *Watts, Hoffmann,
Fisher & Heinke*
ATTORNEYS.

United States Patent Office 3,441,260
Patented Apr. 29, 1969

3,441,260
SEPARATOR
Carl G. A. Johnson, Rocky River, Ohio, assignor to The Alloy Engineering Company
Filed Aug. 22, 1967, Ser. No. 662,460
Int. Cl. F27d 5/00
U.S. Cl. 263—47                                    17 Claims

ABSTRACT OF THE DISCLOSURE

A separator including spaced ribs extending outwardly from a central opening and structure which extends between and maintains the ribs in spaced relation, the structure being fixedly secured to the inner end portions of the ribs and being free to expand and contract independently of the remaining portions of the ribs.

Background of the invention

This invention relates generally to annealing apparatus, and more specifically to separators for use in annealing cylindrical coils of flat material such as steel strip.

Separators conventionally comprise load-bearing ribs which are spaced around and extend outwardly from a central opening through the separator. In one known type of construction the ribs are welded or otherwise fixedly secured to opposite sides of an annular plate. The spaced ribs define gas passages or channels extending from the outer perimeter of the separator to the central opening.

The separators are placed between the coils to be annealed and serve to hold the coils in vertically spaced relation. During a heating cycle of an annealing operation, hot gases are drawn downwardly through the center of the stack of coils and inwardly through the gas channels of each separator into the center of the stack. The heated gases which flow laterally through the channels or gas passages of the separator heat both sides of the annular plate. Since only the sides of the ribs are exposed to the gases, the ribs are heated slower than the plate. As a result, the plate expands more than the ribs during initial heating. The opposite action takes place during the cooling cycle of an annealing operation, and the annular plate cools and contracts faster than the ribs.

In the conventional ribbed separator construction, the ribs are welded or otherwise secured at various points along their edges to the annular plate. The rigid connection of the ribs to the plate restricts the expansion and contraction of the plate during the heating and cooling cycles. Since the plate expands at a faster rate than the ribs during heating, the plates of the conventional separators frequently buckle and upset as the stack of coils and separators is brought up to heat in a furnace. During cooling, the ribs restrict contraction of the plate and the plates of the conventional separators frequently tear.

Another disadvantage of conventional separator construction arises from the fact that the annular plate itself is subjected to differential heating and cooling by the inwardly flowing gases between the ribs. The outer portions of the plate tend to expand and contract faster than the inner portions and this frequently results in stresses that produce buckling, tearing and other damage to the plates.

Summary of the invention

The present invention provides a new separator construction which overcomes the foregoing disadvantages, and in particular reduces the occurrence of tearing, buckling or other damage to the connecting plate due to its different rate of expansion and contraction. The new separator is comprised of a plurality of load bearing ribs which are spaced around and extend outwardly from the central opening of the separator and structure, preferably plate structure, which extends between and maintains the ribs in spaced relation. According to this invention, the ribs are fixedly secured to the plate structure only at their inner ends. The remaining portions of the ribs outwardly of the inner end portions are free to move relative to the plate structure. The outer ends of the ribs are preferably provided with locating members which engage portions of the plate structure to maintain the outer end portions of the ribs in spaced relation while permitting independent expansion and contraction of the plate structure. With this construction and arrangement, the plate structure can expand and contract in response to thermal forces without restraint from the ribs. The ribs can in turn expand and contract independently of the plate structure according to the thermal conditions which are encountered.

In one specific embodiment of the invention the plate structure is formed by a single unitary annular member. Two series of aligned ribs are disposed on opposite sides of the annular plate and are spaced around its central opening to define gas passages or channels. The inner ends of the ribs are welded or otherwise secured to the plate adjacent its inner peripheral edge. A locating member is secured between the outer end portions of each pair of aligned ribs and engages a slot or notch in the outer peripheral edge of the plate. The locating members and slots cooperate to maintain the outer end portions of the ribs in spaced relation while permitting the plate to expand and contract without restrain from the ribs.

In another embodiment of the invention, the plate structure is formed by two or more concentric rings. Ribs are connected to the rings on opposite sides thereof in the manner described above. The rings which form the plate structure of the separator are separate from each other so that the outer ring or rings can expand independently of the inner ring or rings without inducing internal stresses.

This invention also contemplates a new separator construction in which the plate structure is formed by a plurality of segments arranged to define an annulus. In one embodiment of the invention the side edges of adjacent segments are spaced from each other and in another embodiment of the invention the side edges of adjacent segments overlap each other. This construction permits circumferential expansion of the segments as well as radial expansion.

Although the invention is specifically disclosed in connection with a separator of the type characterized by two series of ribs on opposite sides of a plate structure, it will be apparent that the invention can be embodied in other types of separators. For example, a single series of ribs can be arranged around only one side of the plate structure. In other arrangements, one series of ribs can be disposed between two plate structures.

An object of the invention is to provide a new separator construction, and more particularly a separator comprised of at least one series of spaced ribs and structure which extends between and maintains the ribs in spaced relation, the connecting structure being fixedly secured to the ribs adjacent their inner end portions with the remaining portions of the connecting structure being free to expand and contract independently of the ribs.

Another object of the invention is to provide a separator as described in the previous paragraph wherein the ribs are spaced apart by plate structure, preferably in the form of an annulus.

Still another object of the invention is to provide a separator comprised of annular plate structure and a series of aligned ribs spaced around at least one side of the plate structure, the plate structure being free to expand and contract independently of the ribs except at locations adjacent its inner diameter.

Other objects, advantages and a fuller understanding of the invention will be had from the following detailed description when taken in conjunction with the accompanying drawings.

Description of the preferred embodiments

Figure 1:
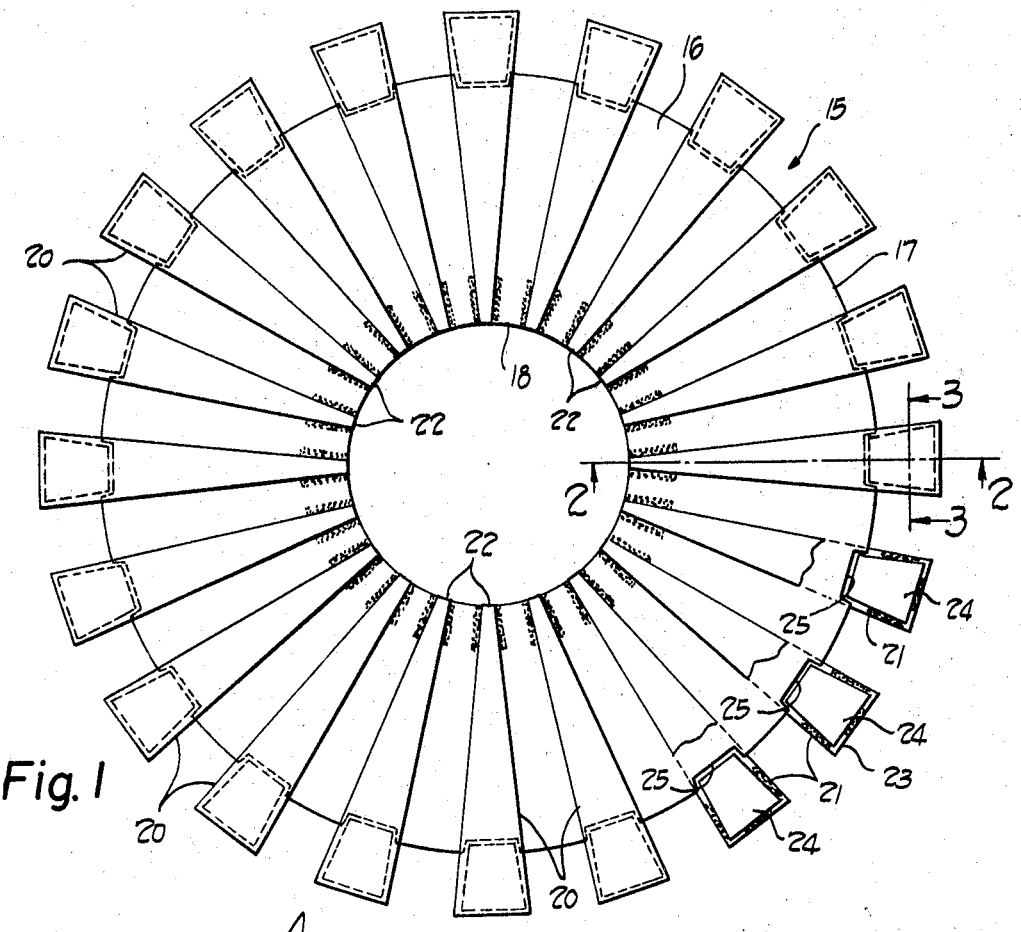
FIGURE 1 is a plan view of a preferred embodiment of the present invention.
Figures 2, 3:
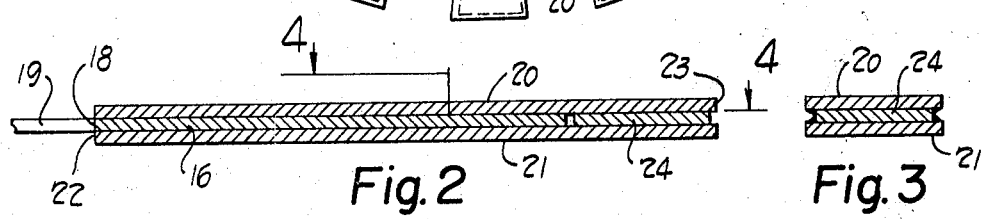
FIGURE 2 is a fragmentary, cross-sectional view taken on the line 2—2 of FIGURE 1.
FIGURE 3 is a fragmentary, cross-sectional view taken on the line 3—3 of FIGURE 1.

Referring now to the drawings, and to FIGURES 1–4 in particular, the illustrated embodiment of the invention is generally designated by reference numeral 15. The separator 15 is comprised of a metal plate structure 16 having an outer edge 17 and an inner edge 18 which defines a central opening 19 through the separator. In the embodiment of the invention shown in FIGURES 1–4, the metal plate structure consists of a single, unitary annular member.

The separator 15 further comprises two aligned series of load-bearing metal ribs 20, 21 which are spaced around opposite sides of the plate structure 16. The spaced ribs 20, 21 cooperate with the plate structure 16 to define gas passages or channels on each side of the plate structure which extend from the outer periphery of the separator 15 to the central opening 19.

As shown, the ribs 20, 21 extend radially of the plate structure 16 between its inner and outer edges, and each rib is in the form of a flat, generally wedge-shaped plate. The relatively narrow inner end portions 22 of the wedge-shaped ribs 20, 21 are spaced around the central opening 19 and the relatively wider outer end portions 23 of the ribs are spaced around the outer edge 17 of the plate structure 16. If desired, the outer end portions 23 may project beyond the outer edge 17 of the plate structure 16 in order to provide support for large size coils. Similarly, the inner end portions 22 may project beyond the inner edge 18 of the plate structure. It is to be understood that the shape, size and positioning of the ribs 20, 21 can be varied and that the illustrated rib formations are not limiting of the present invention. The ribs can be angularly off-set with respect to radial lines of the plate structure, and, for example, may extend along lines which are tangent to the circular inner edge 18. As is well understood in the art, the ribs 20, 21 may be formed by elements having a uniform or varying width which extend along either straight or curved lines.

In accordance with the present invention, the inner end portions 22 of the ribs 20, 21 are fixedly secured, as by welding, to the plate structure 16 adjacent its inner edge 18. The remaining portions of the ribs 20, 21 outwardly of their inner end portions are free to move relative to the plate structure. A locating member 24 is welded or otherwise secured between the outer end portions 23 of each pair of aligned ribs 20, 21. The location members 24 serve to maintain the outer end portions of the ribs in spaced relation around the circumference of the plate structure 16. As shown, the outer edge 17 of the plate structure 16 is formed with a series of slots or notches 25 which are in alignment with each pair of ribs.

Figure 4:
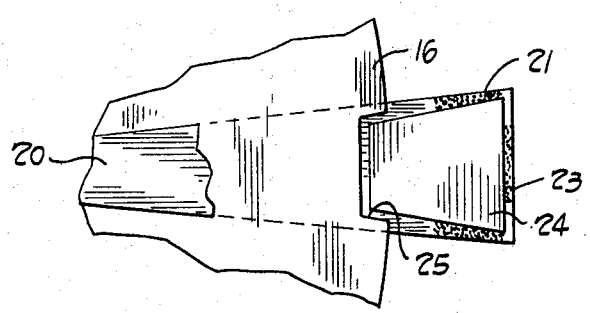
FIGURE 4 is an enlarged view taken on the line 4—4 of FIGURE 2.

The radially inner ends of the locating members 24, which may be in the form of generally wedge-shaped plates, fit within the slots 25. Referring particularly to FIGURE 4, it will be seen that the sides and radially inner end of each locating member 24 is normally spaced from the walls of the slot or notch 25. This construction and arrangement permits relative movement between the ribs and the plate structure in both circumferential and radial directions, thereby permitting the plate structure 16 to expand and contract independently of the ribs 20, 21 and without being restrained by the ribs.

When used for annealing a stack of cylindrical coils of flat material such as steel strip, the separator 15 is placed on top of one of the coils with either series of ribs 20 or 21 in engagement with the edges of the coil. Another coil is then placed on top of the separator in engagement with the other series of ribs so that the weight of the coils above the separator are transmitted through the aligned ribs to the lower coil or coils. A stack of coils which are vertically spaced by the separators is placed within an annealing furnace in the usual manner so that the hot gases will be caused to flow downwardly through the top of the stack and inwardly through the gas channels formed by the ribs 20, 21 into the inside of the stack. The illustrated form of the separator 15 which includes ribs on both sides of the plate structure 16 has the advantage of exposing a maximum area of the coil edges to the flow of hot gases while at the same time providing sufficient area to support the weight of the coils.

When the hot gases flow laterally through the gas passages or channels formed by the spaced ribs 20, 21, both sides of the plate structure 16 are heated. Since only the sides of the ribs 20, 21 are exposed to the laterally flowing gases in the channels or passages, the ribs are heated more slowly than the plate structure. As a result, the plate structure 16 expands faster and to a greater degree than the ribs during initial heating. During the cooling cycle, the opposite action takes place and the plate structure 16 is cooled faster and contracts more rapidly than the ribs 20, 21.

When the separator 15 is constructed in the manner described above so that only the inner end of portions of the ribs 20, 21 are fixedly secured to the plate structure 16 adjacent its inner diameter the plate structure can expand and contract in response to the thermal forces without restraint from the ribs. The ribs can in turn expand and contract independently of the plate structure in accordance with the thermal conditions that are encountered. This independent expansion and contraction of the ribs and of the plate structure thus prevents the plate structure from being damaged during heating and/or cooling.

Figure 5:
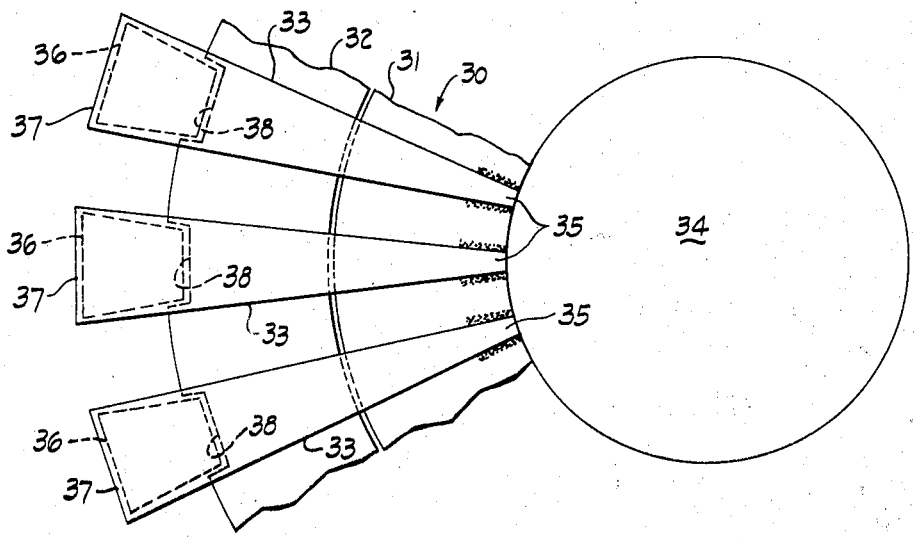
FIGURE 5 is a fragmentary plan view of another preferred embodiment of the invention.

Reference is now made to the embodiment of the invention shown in FIGURE 5. The illustrated separator 30 is comprised of metal plate structure formed by two or more separate concentric rings 31, 32. The separator 30 is further comprised of ribs 33 which may be of the form described above in connection with the embodiment of FIGURES 1–4. The ribs 33 are aligned on opposite sides of the rings 31, 32 and are spaced around the central opening 34 of the separator to form gas channels or passages. The inner end portions 35 of the ribs 33 are fixedly secured, as by welding, to the inner edge portion of the radially inner ring 31. The remaining portions of the ribs 33 outwardly from the end portions 35 are free to move independently of the rings 31, 32. As shown, locating members 36 are secured between the outer end portions 37 of each pair of aligned ribs 33. These locating members 36 fit within slots or notches 38 formed in the outer peripheral edge of the ring 32.

In use the connection of the ribs 33 to the rings 31, 32 permits the rings to expand and contract independently of the ribs in the same manner as the plate structure 16 of the embodiment of FIGURES 1–4. In this embodiment of the invention it is also possible for the radially outer portion of the plate structure formed by the rings to expand and contract independently of the radially inner portion thereof. As previously described, the gases during an annealing operation flow in the channels or passages between the spaced ribs from the outer perimeter of the separator toward the center opening 34. During the heating cycle, this flow of hot gases causes the radially outer portion of the plate structure to heat more rapidly and to expand faster than the radially inner portion of the plate structure. Similarly, during the cooling cycle the radially outer portion of the plate structure cools faster and contracts more rapidly than the radially inner portion. The formation of the plate structure into two or more separate rings 31, 32 is such that the outermost ring can expand and contract relative to the innermost ring without inducing stresses in either member which could cause distortion, buckling or other damage.

Figure 6:
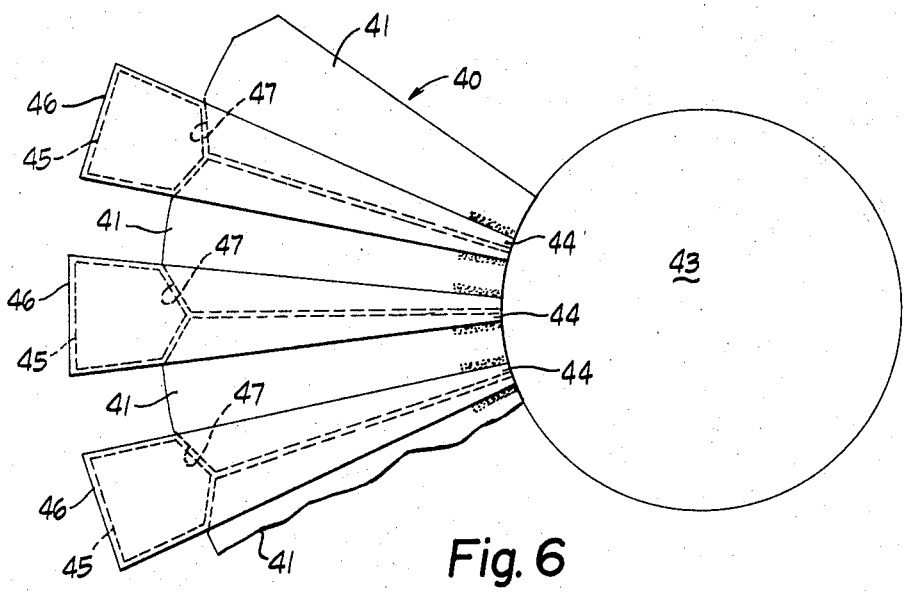
FIGURE 6 is a fragmentary plan view of still another preferred embodiment of the invention.

FIGURE 6 illustrates another embodiment of the invention wherein the metal plate structure of the separator is formed by individual members rather than by a single unitary member. In this embodiment of the invention, the separator 40 is comprised of metal plate structure formed by a plurality of separate, generally wedge-shaped segments 41 which are arranged to define an annulus. Preferably, the side edges of each pair of adjacent segments 41 are normally spaced apart. The separator 40 is further comprised of a plurality of ribs 42 which may be in the form described above in connection with the embodibents of FIGURES 1–4. The ribs 42 are aligned on opposite sides of the segments 41 and are spaced around the center opening 43 of the separator. The inner end portions 44 of the ribs 42 are fixedly secured to the radially inner edge portions of the segments 41 and the remaining portions of the ribs are free to move relative to the segments. A locating member 45 is secured between the outer end portions 46 of each pair of aligned ribs 42. The adjacent corners of each pair of adjacent segments 41 are cut away to form notches 47 which receive the locating members 45. The locating members 45 cooperate with the slots or notches 47 to maintain the outer end portions of the ribs in spaced relation while permitting independent expansion and contraction of the segments 41 relative to the ribs. During heating and cooling, the individual segments 41 are free to expand and contract circumferentially as well as radially without inducing stresses therein.

Figure 7:
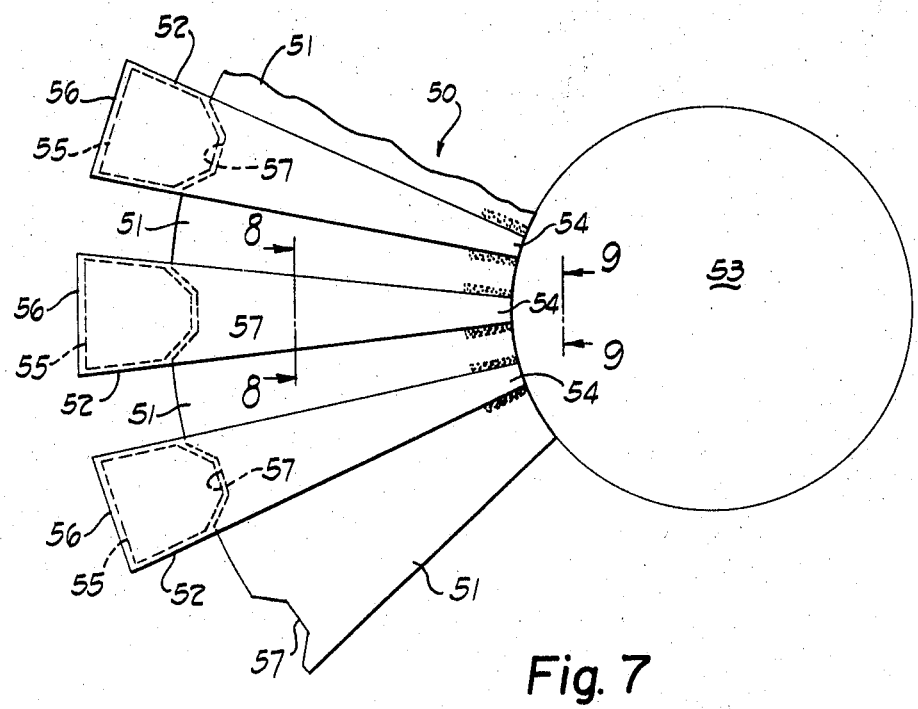
FIGURE 7 is a fragmentary plan view of yet another preferred embodiment of the invention.
Figure 8:
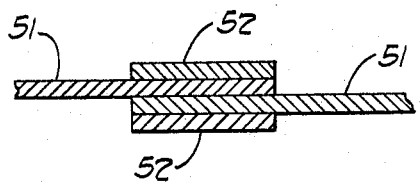
FIGURE 8 is a fragmentary, cross-sectional view taken on the line 8—8 of FIGURE 7.
Figure 9:
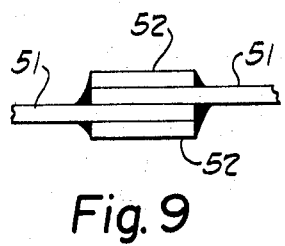
FIGURE 9 is a fragmentary view taken on the line 9—9 of FIGURE 7.

The embodiment of the invention illustrated in FIGURES 7–9 is similar to the embodiment described above in connection with FIGURE 6. The illustrated separator 50 is comprised of metal plate structure formed by a plurality of individual, generally wedge-shaped segments 51 which are arranged to define an annulus. In this embodiment of the invention, the side edges of adjacent segments 51 overlap each other, as shown in FIGURES 8 and 9. The separator 50 is further comprised of ribs 52 which may be in the form described above in connection with the embodiment of FIGURES 1–4. The ribs 52 are aligned on opposite sides of the plate structure formed by the segments 51 and are spaced around the center opening 53 of the separator. The overlapped edges of the adjacent segments 51 are sandwiched between each pair of aligned ribs 52, and the inner end portions 54 of the ribs and the inner overlapping edge portions of the segments 51 are fixedly secured together, as by welding. The remaining portions of the overlapped edges of the segments 51 and the remaining portions of the ribs 52 outwardly from the inner end portions 54 are free to move relative to each other. A locating member 55 is fixed between the outer end portions 56 of each pair of aligned ribs 52. Slots or notches 57 are formed in the outer peripheral edges of the segments 51 and receive the radially inner edges of the locating members 55. The locating members 55 and the slots 57 cooperate to maintain the outer end portions of the ribs 52 in spaced relation while permitting the portions of the segments 41 outwardly from the inner end portions 54 of the ribs to expand and contract independently of the ribs. As in the embodiment of FIGURE 6, the individual segments 51 of the center plate structure can expand and contract circumferentially as well as radially during heating and cooling.

In each of the described embodiments of the invention there has been provided a new separator comprised of spaced ribs and connecting structure that extends between and maintains the ribs in spaced relation. The connecting structure is fixedly secured to the inner end portions of the rib members and can expand and contract independently of the remaining portions of the rib members. With this construction and arrangement, the connecting means is unrestrained by the rib members adjacent their outer ends and is free to expand and contract at a different rate. Many other modifications and variations of the invention will be apparent to those skilled in the art in view of the foregoing detailed disclosure. Therefore, it is to be understood that the invention can be practiced otherwise than as specifically shown and described.

What is claimed is:

1. A separator comprising a plurality of spaced rib members which define gas passages extending outwardly from a central opening through said separator, and connecting means extending between and maintaining said rib members in spaced relation, said connecting means being fixedly secured to the inner end portions of said rib members and being free to expand and contract independently of the outer end portions of said rib members.

2. A separator as claimed in claim 1 wherein said connecting means is formed by plate structure, the portions of said plate structure outwardly of said inner end portions being free to expand and contract independently of said rib members.

3. A separator as claimed in claim 2 wherein said rib members are disposed on both sides of said plate structure.

4. A separator as claimed in claim 2 wherein said plate structure comprises at least one unitary annular member.

5. A separator as claimed in claim 2 wherein said plate structure comprises a plurality of separate rings.

6. A separator as claimed in claim 2 wherein said plate structure comprises a plurality of segments arranged to define at least one annulus.

7. A separator as claimed in claim 6 wherein the side edges of the segments defining each annulus are spaced apart.

8. A separator as claimed in claim 6 wherein the side edges of the segments defining each annulus overlap each other.

9. A separator comprising a plurality of ribs having inner end portions arranged around a central opening and fixedly secured in spaced relation, and means extending between and maintaining the outer end portion of said ribs in spaced relation, said means being free to expand and contract independently of said outer end portions of said ribs.

10. A separator comprising metal plate structure having an inner edge which defines a central opening through said separator and an outer edge, rib structure carried by said plate structure on at least one side thereof, said rib structure including a plurality of rib members fixed to said plate structure near said inner edge, and said rib members and plate structure including interengaging portions for maintaining said rib members in spaced relation while permitting independent expansion and contraction of said rib members and plate structure.

11. A separator as claimed in claim 10 wherein said interengaging portions comprise slots in one of said structures and locating members secured to the other of said structures and disposed within said slots.

12. A separator comprising plate structure having an outer edge and an inner edge defining a central opening, a plurality of rib members spaced around said plate structure on at least one side thereof, said rib members having their inner end portions fixedly secured to said plate structure adjacent said inner edge and their remaining portions free to move relative to said plate structure, and said rib members including locating members engageable with said plate structure for maintaining the outer end portions of said rib members in spaced relation while permitting the portions of said plate structure outwardly of said inner end portions to expand and contract independently of said rib members.

13. A separator as claimed in claim 12 wherein said rib members are disposed on both sides of said plate structure.

14. A separator as claimed in claim 13 wherein said rib members extend radially of said plate structure.

15. A separator comprising metal plate structure having an outer edge and an inner edge defining a central opening, two aligned series of metal load bearing ribs spaced around opposite sides of said plate structure, said ribs extending radially of said plate structure between said inner and outer edges, said ribs having their inner end portions fixedly secured to said plate structure adjacent said inner edge and having their remaining portions free to move relative to said plate structure, and said ribs including locating members engageable with said plate structure to maintain the outer end portions of said ribs in spaced relation while permitting the portions of said plate structure outwardly of said inner end portions to expand and contract independently of said ribs.

16. A separator as claimed in claim 15 wherein said plate structure has a series of spaced slots which are aligned with said ribs, and wherein said locating members are engaged in said slots.

17. A separator as claimed in claim 15 wherein the outer ends of said ribs extend beyond the outer edge of said plate structure.

References Cited
UNITED STATES PATENTS

| | | |
|---|---|---|
| 1,870,551 | 8/1932 | Brown. |
| 2,671,656 | 3/1954 | Winder. |
| 3,145,982 | 8/1964 | Ludwig. |

JOHN J. CAMBY, *Primary Examiner.*